Feb. 5, 1963 A. W. SPITZ 3,076,421
METHOD OF INCINERATING WIRE SCRAP
Filed Oct. 29, 1958

INVENTOR.
ALBERT W. SPITZ
BY Harry Langsam
ATTORNEY

Patented Feb. 5, 1963

3,076,421
METHOD OF INCINERATING WIRE SCRAP
Albert W. Spitz, Elkins Park, Pa.
Filed Oct. 29, 1958, Ser. No. 770,346
4 Claims. (Cl. 110—18)

My invention relates to a portable incinerator, and more particularly relates to a portable incinerator for the removal of organic materials from metal substances by burning without melting or oxidizing the metal portion.

The organic materials attached to the metal portion consists of rubber, styrene, vinyl, polyethylene, miscellaneous fibres such as cotton, wool, synthetic fibres, attached to insulated wire, plastic and metal objects such as electronic equipment, telephone equipment, and the like. It is necessary to remove these organic materials from the metal to economically and efficiently salvage the metal.

Prior methods include mechanically stripping the insulation from the wire; chemically treating insulated wire and other combined organic and metal materials to dissolve the organic portions. These methods were not effective and in many instances resulted in contaminating the adhering metal.

Another method was to burn the organic materials from the metal scrap and resulted in the production of enormous amounts of black smoke and strong obnoxious odors prohibited by ordinance.

Prior efforts to burn the organic materials in incinerators of conventional design have resulted in undesirable melting and oxidation of the metals by virtue of excessively high temperatures, and also expensive and difficult materials handling problems are presented.

It therefore is an object of my invention to provide a method for recovery of metal from insulated metal scrap.

Another object of my invention is to provide a method for the burning of the organic materials from metal scrap for recovery of the bare metal thereof.

Another object of my invention is to provide a portable incinerator for wire or metal scrap wherein the organic materials may be completely burned off and the bare metal recovered.

Another object of my invention is to provide a portable incinerator for insulated wire or metal scrap wherein complete combustion of the organic matter may be effected.

Another object of my invention is to provide a portable incinerator for burning the insulation from wire to metal scrap wherein a minimum of smoke will be produced in the burning operation and any objectionable odor eliminated.

Another object of my invention is to provide a portable incinerator for burning the insulation from wire scrap which will meet with Air Pollution Control Ordinances.

Another object of my invention is to provide a portable incinerator with effective means of combustion control which will not melt the scrap metal and wherein the materials handling has been simplified by the portable feature of the incinerator which permits it to be brought to and placed over piles of scrap on the ground.

Other objects of my invention are to provide an improved device of the character described, that is easily and economically produced, which is labor saving and which is sturdy in construction, and which is highly efficient in operation.

With the above and related objects in view, my invention consists in the details of construction and combination of parts, as will be more fully understood from the following description, when read in conjunction with the accompanying drawing, in which.

Referring now in greater detail to the drawings in which similar reference characters refer to similar parts, I show a portable incinerator, generally designated as A, for complete combustion of organic materials on wire or metal scrap, generally designated as B.

Figures 1, 2:
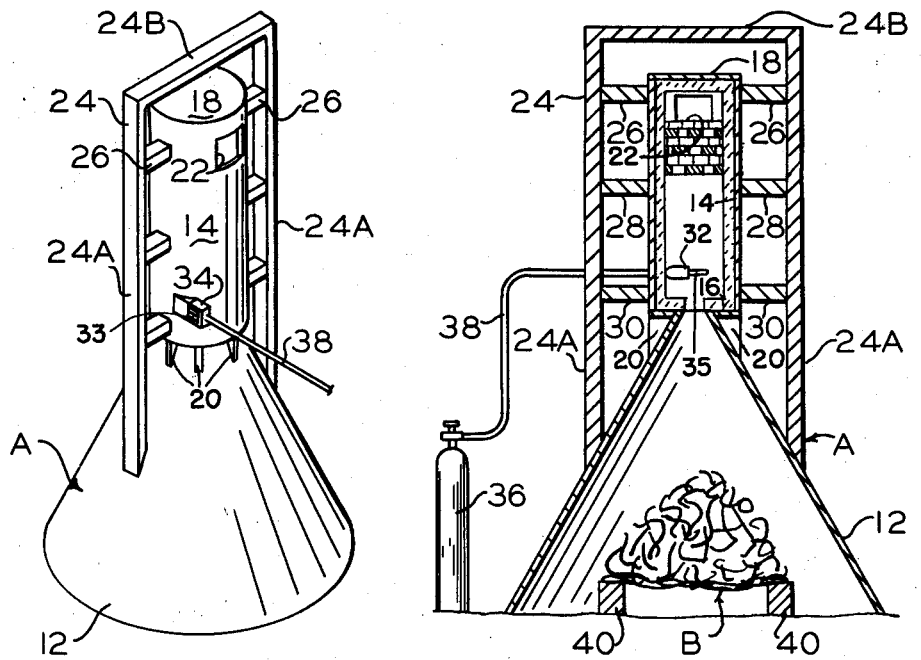
FIG. 1 is a perspective view of an incinerator for wire or metal scrap embodying my invention.
FIG. 2 is a sectional view thereof.
Figures 3, 4:
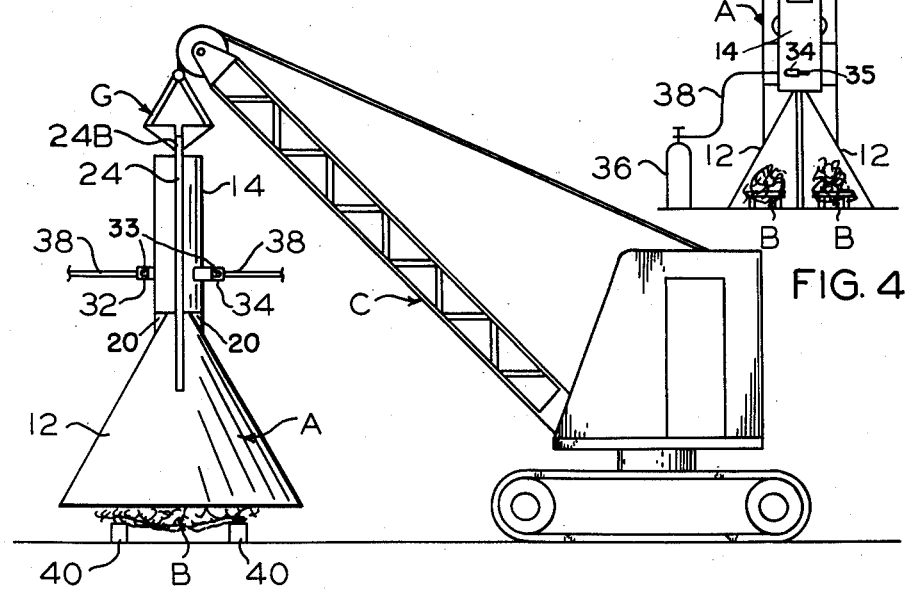
FIG. 3 is a side view of the incinerator illustrating the portability thereof by carrying it about upon a crane.
FIG. 4 is a view similar to FIG. 2, but wherein two combustion chambers are shown, a single combustion chamber may serve two or more incinerators.

The portable incinerator A comprises a lower frusto-conical shell 12 welded to a cylindrical chimney 14 forming a combustion chamber. The interior of the shell 12 communicates with the chimney 14 through an aperture in a base plate 16. A cap 18 is secured to the top of the cylindrical chimney 14 and defines a closure therefor. A plurality of circumferentially spaced ribs 20 weld the frusto-conical shell 12 to the base plate 16 and provide an integrated structurally strong unit. An aperture 22 in the chimney 14 provides for exhaust of the burning gases.

A U-shaped frame 24 of steel channel has a pair of legs 24A welded at their lower portions thereof to the shell 12. A bight portion 24B is spaced above the chimney 14 and the cap 18 thereof while the legs 24A are spaced laterally of the chimney 14. A plurality of transverse metal ribs 26, 28 and 30 respectively are welded intermediate the frame 24 and the chimney 14 to provide structural support therefor and permit the incinerator to be carried about by the frame 24 with a vehicle carrying crane, generally designated as C.

A pair of Bunsen or other conventional air-inducing type gas burners 32 and 34 are provided at diametrically opposite portions of the chimney 14, discharging into the chamber defined therein. Each of the gas burners 32 and 34 has the customary adjustable air-inlet port 33 and nozzle 35 and is fed by a highly inflammable gas, from a compressed gas cylinder 36 through tubing 38. Suitable gases for this purpose may be manufactured gas, propane and acetylene gas.

A pile of the insulated wire or metal scrap B is placed upon longitudinally extending, spaced rails 40 resting on the ground. Readily ignitible fuel is introduced into the pile of wire or metal scrap B and ignited to start the fire. The portable incinerator A carried by the crane C is then placed over the burning pile of scrap B with the frusto-conical shell 12 laying upon the ground and completely enclosing the burning pile. As the ground is generally not level but slightly undulating or otherwise irregular, there is usually more than sufficient clearance between the lower edge of the shell 12 and the ground through which air may enter the bottom of the cone 12. If the natural irregularities of the ground do not provide sufficient clearance beneath the lower edge of the shell 12 for passage of air at a sufficient rate to sustain the suppressed or incomplete combustion therewithin, earth may be removed from beneath the edge of the cone at suitable intervals. Sealing material, such as loose earth, sand or gravel, may be suitably piled around the outer periphery of the cone 12 to whatever extent it may be necessary to keep the ingress of air down to a rate which will prevent the combustion within the cone 12 from becoming so rapid as to raise the temperature to the melting point of the metal content of the scrap and prevent the oxidation of such metal. As combustion continues, sealing material surrounding the bottom of the cone may be removed to allow air to enter through the bottom of the cone. As a modification of my invention apertures with any suitable closure therefor may be provided in the cone to control the combustion. The smoke emitted from the incompletely burning insulation will enter the combustion chamber 14 and begin to exit from the exhaust port 22. However, the burners 32 and 34 are also ignited and the high temperature created by the burning of the fuel supplied to said burners, ignites the smoke by functioning as an after-burner within the combustion chamber defined by the chimney 14. The chamber 14 is refractory lined, and a refractory brick checkerwork is provided prior to the gas exit, to promote complete oxidation of any remaining organic vapors of carbon particles. Thus, the after-burner causes the carbon particles and partially decomposed organics in the smoke to be completely oxidized. It is also to be noted that the oxygen from the atmosphere may enter the refractory-lined combustion chamber 14 through the air-inlet ports 33 of the burners 32 and 34 to combine with the carbon particles in the smoke which are reignited. The gases discharged through the chimney discharge 22 are virtually colorless.

Greater draft may be provided by allowing air to enter the bottom of the incinerator in order to obtain greater combustion or oxidation of the burning organic materials attached to the wire or scrap and to elevate the temperature thereof. Additional control is afforded by increasing or decreasing the flow of the air and gas into the burners 32 and 34. It will thus be seen that the undesirable melting and oxidation of the metal content of the scrap by excessively high temperatures (as in the prior art practice referred to hereinabove) is avoided and the bare metal is recovered, by first burning the scrap-pile within the conical sheet-metal shell 12 with such limitation on the ingress of air to the scrap pile as will prevent complete combustion of the combustible organic wire-coating materials and will keep the rate of combustion down to a point at which the temperature of the burning scrap-pile will be below the melting point of the metal content thereof but yet sufficiently high to volatilize the organic wire-coating materials.

As such incomplete burning of the organic coverings of the wire proceeds, a large part of the organics are volatilized without going through complete combustion however. Some of the free carbon produced by such destruction of the organic coatings remains as a fragile non-adherent interrupted carbon film along portions of the wire, and some of the free carbon particles are entrained in and carried along with the effluent gases from the burning scrap-pile. The free carbon and the incompletely burned gaseous products act as reducing media to prevent the oxidation of the metal content of the scrap.

Any carbonized film remaining on the scrap wire after the aforementioned incomplete combustion of the organic coverings thereof has been completed, is fragile and non-adherent and crumbles and falls off when the so finished wire-scrap is further handled as by shaking or compressing it, thereby leaving the unmelted scrap wire bare and unoxidized.

The refractory lining of the chamber 14 becomes heated and the entire interior of the chamber 14 is maintained at a temperature considerably higher than the temperature in the burning scrap-pile, and this higher temperature in the combustion chamber 14, together with the additional air entering the chamber 14 through the air-inlet ports of the burners 32 and 34 thereof, causes a complete combustion of the effluent gases from the scrap pile, including any free carbon entrained therein. Thus, the gases issuing from the burning scrap-pile comprise products of the burning of the organic wire coverings, at various stages of combustion and volatilization. This admixture of gases (and such solid particles as may be entrained therein) are then fully burned at the elevated temperature within the refractory-lined chamber 14, so as to be converted into smokeless gas which leaves the combustion chamber 14 through the discharge openings 22.

Although my invention has been described in considerable detail, such description is intended as being illustrative, rather than limiting, since the invention may be variously embodied, and the scope of the invention is to be determined as claimed.

I claim as my invention:

1. The method of removing organic coverings from scrap insulated electrical wire without substantially melting or oxidizing the metal content thereof while yet obtaining substantially complete combustion of the organic coverings thereof, which method comprises introducing fuel to a loose random pile of such scrap wire, igniting said fuel and said scrap, admitting air to the so ignited pile of scrap at such limited rate and air-cooling the zone surrounding the so ignited scrap-pile at such rate that the combustion of the organic coverings in the scrap pile will be incomplete and generally limited to the extend necessary to volatilize such organic coverings without the complete combustion of a substantial portion thereof and that the temperature of the scrap pile is kept below the melting point of the metal content thereof, thereafter passing the resultant effluent of gaseous products of such incomplete combustion and of such volatized organic coverings and any solid particles entrained therein through a long refractory-lined flow-path commencing beyond the aforementioned air-cooled zone and introducing a sufficient amount of fuel and air into said flow-path near the upstream end thereof and burning such fuel to heat the refractory-lining of said flow-path and such effluent therein to a temperature necessary to effect a substantial combustion of the aforementioned effluent within said flow-path.

2. The method of removing organic coverings from scrap insulated electrical wire without substantially melting or oxidizing the metal content thereof while yet obtaining substantially complete combustion of the organic coverings thereof, which method comprises introducing fuel to a loose random pile of such scrap wire, igniting said fuel and said scrap, admitting air to the so ignited pile of scrap at such limited rate and air-cooling the zone surrounding the so ignited scrap-pile at such rate that the combustion of the organic coverings in the scrap pile will be incomplete and generally limited to the extent necessary to volatilize such organic coverings without the complete combustion of a substantial portion thereof and that the temperature of the scrap pile is kept below the melting point of the metal content thereof, thereafter passing the resultant effluent of gaseous products of such incomplete combustion and of such volatized organic coverings and any solid particles entrained therein through a long refractory-lined flow-path commencing beyond the aforementioned air-cooled zone and introducing a sufficient amount of fuel and air into said flow-path near the upstream end thereof and burning such fuel to heat the refractory-lining of said flow-path and such effluent therein to a temperature necessary to effect a substantial combustion of the aforementioned effluent within said flow-path.

3. The method of removing organic coverings from random bales of scrap electric wire, in situ, on a loose scrap-pile thereof, which comprises introducing fuel to such loose scrap-pile and igniting said fuel and said scrap-pile, superimposing upon such loose scrap pile, in situ, a bottomless pile-enclosing chamber and admitting air to the so ignited and enclosed scrap pile at such limited rate and air-cooling the zone of said ignited scrap and the resultant gaseous products within said chamber that substantially all of such organic coverings will be converted into gaseous or gas-entrained materials, but with an incomplete combustion of a substantial portion of the so gasified and gas-entrained materials and that the temperature within said scrap-enclosing chamber will be below the melting point of the metal content of the electric wire, thereafter passing such effluent of the gaseous products from the scrap-pile and any solid matter entrained therein through a long refractory-lined flow-path beyond said chamber and introducing a sufficient amount of fuel and air into said flow-path near the upstream end thereof and burning such fuel within such flow-path to heat the refractory lining thereof and such effluent therewithin to a temperature necessary to effect a substantial combustion of such effluent within said flow-path.

4. The method of removing organic coverings from random bales of scrap electric wire, in situ, on a loose scrap-pile thereof, which comprises introducing fuel to such loose scrap-pile and igniting said fuel and said scrap-pile, superimposing upon such loose scrap pile, in situ, a bottomless pile-enclosing chamber and admitting air to the so ignited and enclosed scrap pile at such limited rate and air-cooling the zone of said ignited scrap and the resultant gaseous products within said chamber that substantially all of such organic coverings will be converted into gaseous or gas-entrained materials, but with an incomplete combustion of a substantial portion of the so gasified and gas-entrained materials and that the temperature within said scrap-enclosing chamber will be below the melting point of the metal content of the electric wire, thereafter passing such effluent of the gaseous products from the scrap-pile and any solid matter entrained therein through a long refractory-lined flow-path beyond said chamber and introducing a sufficient amount of fuel and air into said flow-path near the upstream end thereof and burning such fuel within such flow-path to heat the refractory lining thereof and such effluent therewithin to a temperature necessary to effect a substantial combustion of such effluent within said flow-path, and thereafter passing the so resultant effluent through and in intimate contact with super heated refractory checkerwork just prior to its exit to the atmosphere to effect a substantial complete combustion thereof.

References Cited in the file of this patent

UNITED STATES PATENTS

| | | |
|---|---|---|
| 266,850 | Lovelace | Oct. 31, 1882 |
| 1,082,644 | Morgan | Dec. 30, 1913 |
| 1,528,816 | Cummings | Mar. 10, 1925 |
| 1,773,256 | Breitwieser | Aug. 19, 1930 |
| 2,656,008 | Engel | Oct. 20, 1953 |
| 2,752,870 | Short et al. | July 3, 1956 |
| 2,815,278 | Wilkins | Dec. 3, 1957 |